United States Patent [19]
Convine

[11] Patent Number: 5,131,217
[45] Date of Patent: Jul. 21, 1992

[54] MECHANICAL HARVESTER

[76] Inventor: William G. Convine, 'Capriquaris' RMB Coraki Road, Ruthven, Australia, 2480

[21] Appl. No.: 609,774

[22] Filed: Nov. 7, 1990

[30] Foreign Application Priority Data

Nov. 13, 1989 [AU] Australia .................................. PJ7338

[51] Int. Cl.⁵ .............................................. A01D 46/00
[52] U.S. Cl. .................................................. 56/328.1
[58] Field of Search ................. 56/328.1, 329, 219–223, 56/153, 164

[56] References Cited

U.S. PATENT DOCUMENTS

| | | | |
|---|---|---|---|
| 4,322,940 | 4/1982 | White | 56/328.1 |
| 4,364,222 | 12/1982 | Ramacher | 56/328.1 |
| 4,706,447 | 11/1987 | Watmough et al. | 56/328.1 |
| 4,982,559 | 1/1991 | Calais | 56/328.1 |

Primary Examiner—Thuy M. Bui
Attorney, Agent, or Firm—Larson & Taylor

[57] ABSTRACT

A harvesting apparatus harvests produce or the like off the ground. The apparatus includes a plurality of collection modules pivotably mounted within a supporting frame, each module being permitted a degree of vertical movement and resting, in use, on the ground; and a produce conveyor which delivers produce collected by the collection modules to a discharge point. Each collection module comprises a brush which sweeps, in use, produce encountered on the ground and a grill which directs collected produce to the produce conveyor. The brush is circular with radial bristles and is rotated, in use. The grill comprises fingers extended into the brush, the fingers being sufficiently spaced to allow passage of unwanted swept material therebetween but spaced sufficiently to catch and direct the produce to be harvested.

11 Claims, 4 Drawing Sheets

MECHANICAL HARVESTER

FIELD OF INVENTION

THIS INVENTION relates to harvesters and in particular to harvesters which are operative to collect produce and other like articles such as nuts and golf balls lying on the ground.

Macadamia nuts fall to the ground when ripening and as a general rule they are harvested by hand. Various machines that are designed for other purposes have been tried for harvesting macadamia nuts but they have not been successful for a variety of reasons. A similar collection problem exists at golf driving ranges where a large number of golf balls are to be retrieved.

Prior attempts at harvesting macadamia nuts have not proved successful because of factors such as disturbance of surface roots of the nut trees by raking and sweeping procedures; removal of soil and compost from beneath the trees when picking up nuts; compaction of the area between trees because of considerable machine weights, etc.

The present inventor has investigated a full vacuum type harvester with a reasonable result but the machine experienced problems with mulch and dead leaves which accumulate in considerable numbers beneath macadamia trees.

OBJECT OF THE INVENTION

It is an object of the present invention to provide a harvester with improved performance which is less affected by the above stated disadvantages.

Other objects and various advantages realised by the invention will hereinafter become apparent.

BRIEF SUMMARY OF THE INVENTION

The invention achieves its object in the provision of a harvest apparatus for the harvesting of produce and other like articles off the ground which comprises:
  a supporting frame for the pivotal mounting of collection modules therein;
  a plurality of collection modules mounted within the supporting frame, each module being permitted a degree of vertical movement and being rested, in use, on the ground; and
  a produce and other like article conveyor whereby produce and other like articles collected by the collection modules is delivered to a discharge point;
  each collection module comprising:
  a brush means which collects, in use, produce and other like articles encountered on the ground; and
  a grill means which directs collected produce and other like articles to the produce and other like article conveyor;
  the brush means being a circular brush with radial bristles which is rotated, in use, and
  the grill means comprising fingers extended into the brush, the fingers being sufficiently spaced to allow passage of unwanted swept material therebetween but spaced sufficiently to catch and direct the produce and other like articles to be harvested.

Throughout the specification the following terms are to be given meanings including the following in addition to their normal dictionary meanings except where the context at any point dictates something more narrow.

Produce includes nuts, golf balls, and generally any nodular objects which may be required to be collected off a surface.

A supporting frame is a means whereby collection modules may be passed, wheeled, rolled or trailed over the ground and whereby means, apparatus and devices to collect, aggregate, bring together, convey or deliver produce may be associated with collection modules in an operative manner to enable harvesting. The supporting frame might comprise any of a framework of struts, integrally joined panelling, or combination thereof. The framework may comprise an elongate wheeled housing enclosing collection modules and produce conveyors and provide mountings for motors, transmissions, blowers, in addition to collection modules.

Collection modules are produce collection means operative to scoop, rake, brush, propel, project or otherwise pick up produce from the ground for the purpose of harvesting with provision to separate produce from other material such as mulch which is desirably retained on the ground without causing disturbance to tree roots and include in operative relationship brush means and grill means.

Brush means brush, propel, project or otherwise provide the energy to move produce in association with grill means in a manner enabling collection of produce as distinct from mulch and other debris affected by the brush.

Grill means scoop, rake, trap, filter, guide or separate produce affected by the brush means. The grill means may define a collection passage through which produce passes to a collection volume whereat the produce from a plurality of collection modules is collected, aggregated, added or otherwise bought together. The grill means may be in the form of grids, rakes fingers or other like screens whereby produce is selectively trapped.

BRIEF OUTLINE OF THE DRAWINGS

The invention will now be described in greater detail with reference to a preferred embodiment as shown in the accompanying drawings in which.

PREFERRED EMBODIMENT

Figure 1:
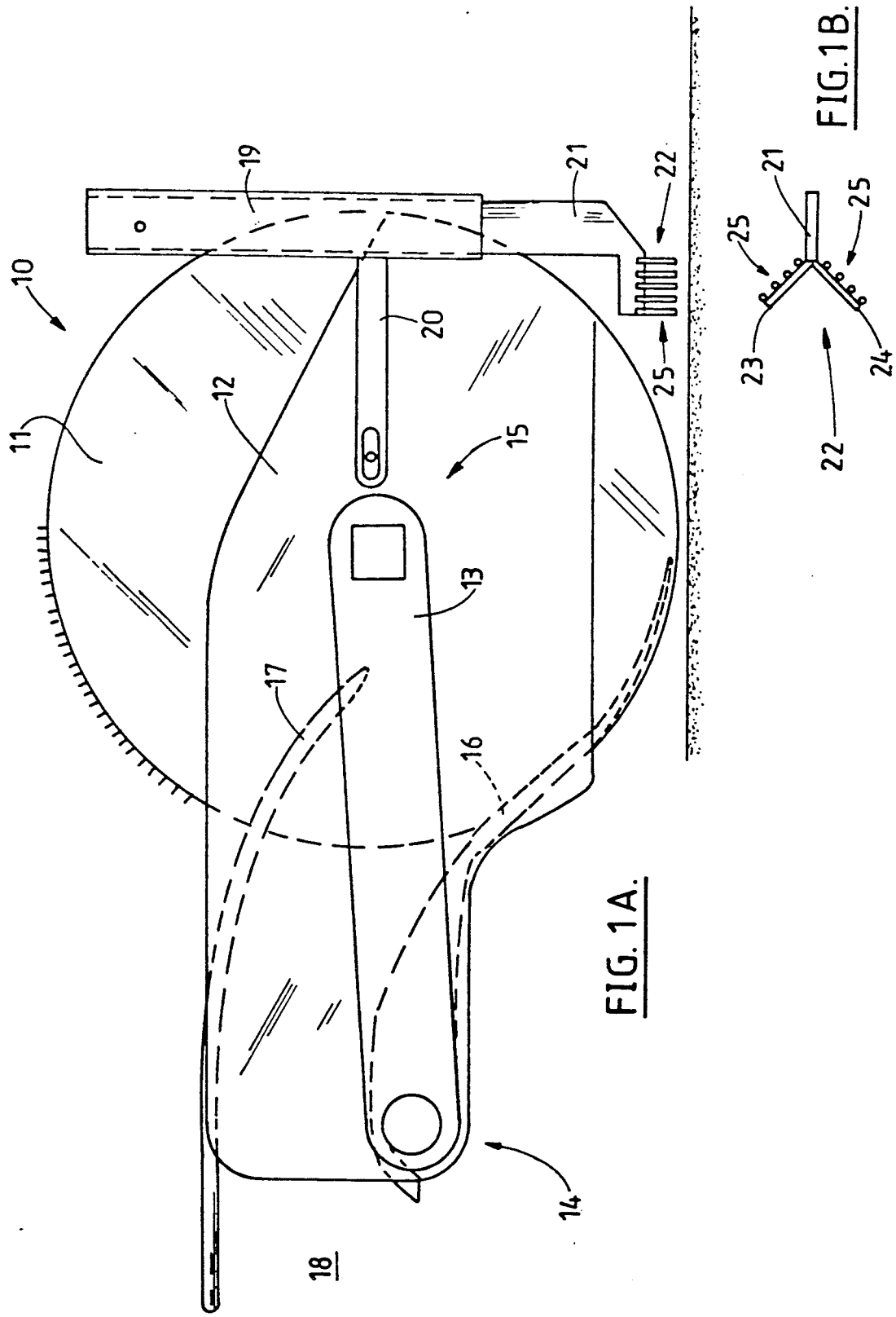
FIG. 1A is an elevation showing the features of a module as employed in an embodiment of the invention.
FIG. 1B is a plan view of a clearing device utilised in association with the modules as set out in FIG. 1.
Figure 2:
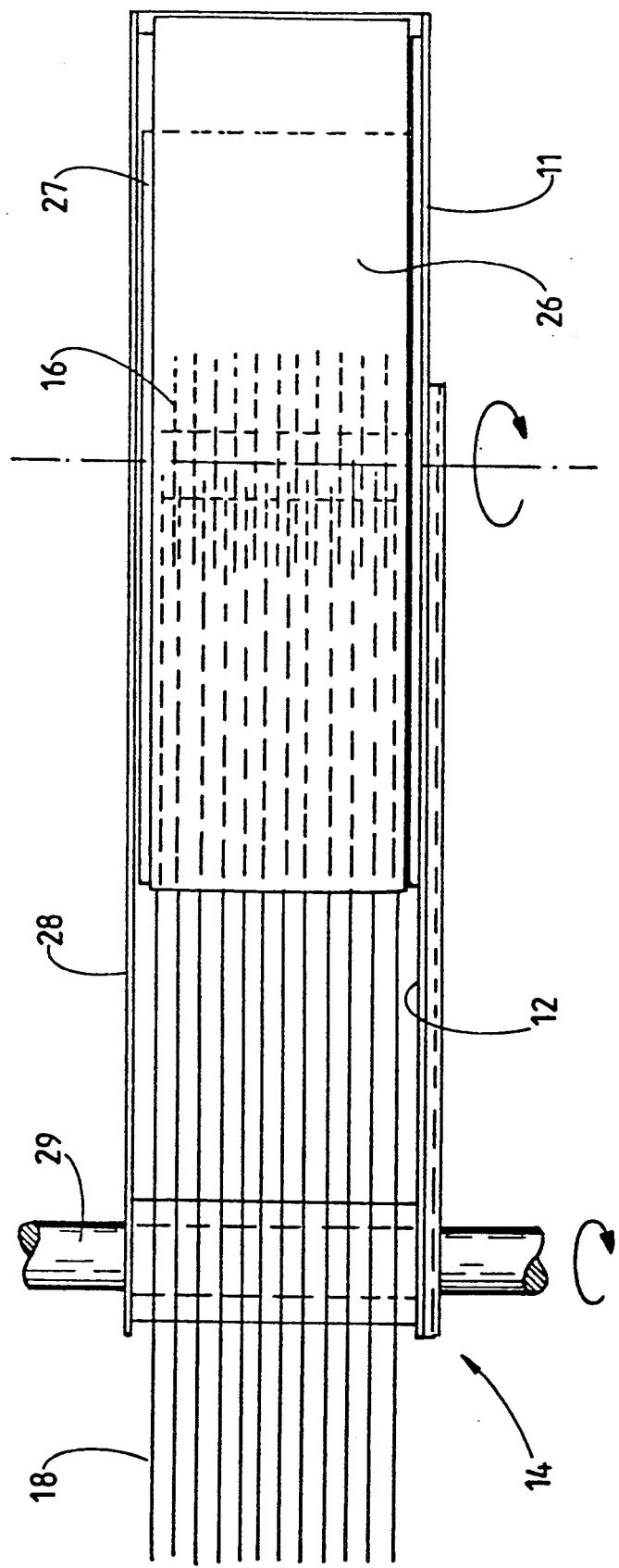
FIG. 2 is a plan view of the module of FIG. 1.

In FIGS. 1 and 2 is seen a module, a plurality of which may be used side by side to sweep a wide area. Module 10 comprises a bush 26 between side wheels 11 and 27 (FIG. 2) rotatively mounted between side plates 12 and 28 which side plates are pivotally mounted at 14 to allow the brush between its side wheels 11 and 27 to trundle over the ground and follow what contours it meets independently of its neighboring modules. A chain guard 13 encloses a chain drive from a drive shaft 29 (see FIG. 2) at 14 to a driven axle at 15 to power brush 26 to cause it to rotate as the module is trundled over the ground. In practice the module is moved to the right with brush 26 rotated clockwise to sweep produce to the left.

In order to pick up produce which is swept by brush 26, two grids of elongate elements or fingers may be provided, a lower grid 16 and an upper grid 17. These define a chute therebetween through which produce is propelled by brush 26. The grids extend into the brush as shown with fingers passed into and between the bristles. The spacing of the fingers is such as to catch produce but to allow other material, mulch, soil, etc. to pass through. Produce projected by the brush passes at discharge point 18 to a produce collection means described below.

When a linear array of the modules is established, there is a gap between each in which produce might slip past the machine unaffected by its passage and this gap is addressed by a rake means 22 mounted on a shaft 21 telescopically received in a support 19 mounted to permit its movement on arm 20. Rake 22 comprises two arms 23 and 24 angled sideways to cover the gap, with dependent prongs 25 to move produce sideways into the path of a brush.

In the above module, the brush 26 is powered, turning between freely rotating enclosing side wheels 11 and 27 and it is mounted by side plates 12 and 28 to permit some free vertical movement to roll over uneven ground without affecting the operation of adjoining brushes.

Figure 3:
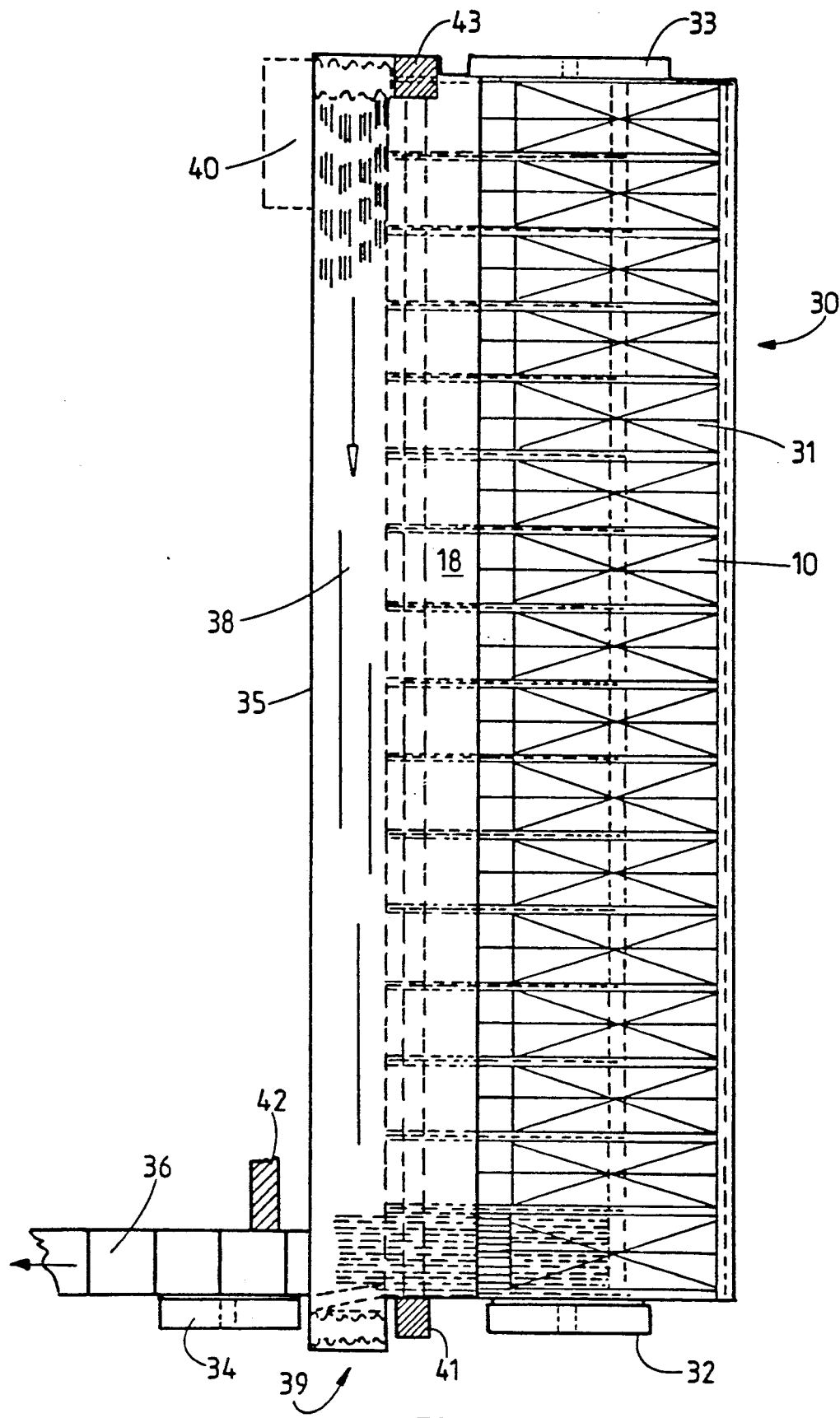
FIG. 3 is a plan view of a harvesting apparatus in accordance with an embodiment of the invention.
Figure 4:
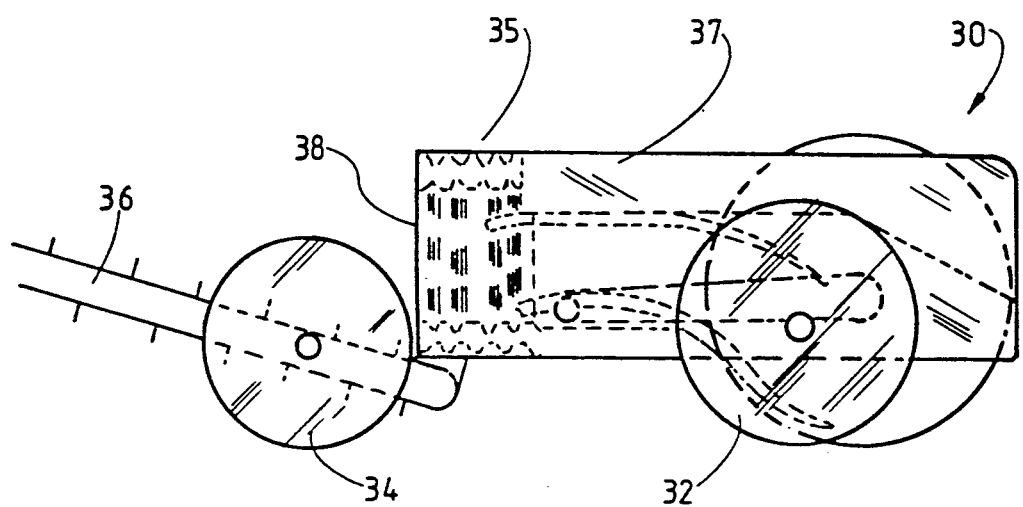
FIG. 4 is an end elevation of the harvesting apparatus of FIG. 3.

In FIGS. 3 and 4 is seen an apparatus 30 which utilises a plurality of modules 31, side by side on a common powered shaft. Apparatus 30 may be boxed in by vertical side walls 37 (FIG. 4) and the trailing wall 38 may be vented so that material other than produce which is thrown back by the brushes may pass therethrough if it be smaller than the produce which the vented wall 38 must stop. The module 10 in FIG. 3 discharges at 18 into the conveyor 35 to be carried to a discharge belt 36 which may drop produce into a trailer travelling besides the apparatus. The apparatus 30 trails along on wheels 32 to 34.

The conveyor 35 may comprise a plurality of spaced belts passed around end pulleys to create a volume into which produce is projected and caught within the open belting providing a further way in which trash may be lost from the system. Produce is moved by the belting to end 39 whereat the produce may be transferred to conveyor 36.

The above described unit may trail with a small ground clearance. Modules may be 200 mm wide and generally 12 modules might be used. Drive to the brushes might be hydraulic. The brushes might be standard type industrial, heavy duty brooms 500 mm in diameter and 12 mm wide and these may be spaced by heavy spacers with 12 of the brooms making up the brush of a module. The brooms may be fitted to a square shaft on which the enclosing side wheels of the module are freely mounted for rotation and these serve to govern pickup rake height. The drive shaft might be driven at 150 rpm and the module may be free to swing on the shaft through an arc typically some 300 mm. The drive shaft may be hydraulically driven with variable speed control. The drive chain to the module might transmit power in a 1:1 ratio. The rakes or grids may be formed from sharpened quality flat steel supported and welded approximately 15 mm apart. The apparatus might move at a ground speed of 4 to 6 kph. The rakes may be held about 10 mm from the ground. The conveyor belt 35 may comprise typically 6 V-type belts being industrial belting. Two of the four pulleys might be adjustable for tensioning of the belts of conveyor 35. Again hydraulic power might drive this conveyor. With nuts falling onto the inside of the belts, the gaps and 40 angles help separate debris from produce.

In the above described apparatus, the problem of soil and mulch being collected is reduced by the rakes, grill and conveyor all providing a means whereby such material may be filtered from produce.

In use of the above harvester, nuts dropped between trees within a row of trees present a problem and a fan 40 might be mounted at the outer end to blow nuts into the next aisle between the trees for collection on the sweep through that aisle.

In FIG. 3, 41, 42 and 43 indicate locations for hydraulic motors to power the various elements of the apparatus. Each module might be separately powered by its own hydraulic motor.

The above described apparatus is a preferred form, which, in practice, will be capable of adaptation by those skilled in the art into many different forms within the scope of the invention.

I claim:

1. A harvester apparatus for the harvesting of produce and other like articles off the ground which apparatus comprises:

a supporting frame for the pivotal mounting of collection modules therein;

a plurality of collection modules mounted within the supporting frame, each module being permitted a degree of vertical movement and being rested, in use, on the ground; and a produce conveyor whereby produce collected by the collection modules is delivered to a discharge point;

each collection module comprising:

a brush means which sweeps, in use, produce and other like articles encountered on the ground; and a grill means which directs collected produce and other like articles to the produce conveyor;

the brush means being a circular brush with radial bristles which is rotated, in use, and the grill means comprising fingers extended into the brush, the fingers being sufficiently spaced to allow passage of unwanted swept material therebetween but spaced sufficiently to catch and direct the produce and other like articles to be harvested.

2. A harvester as claimed in claim 1 wherein at least one collection module comprises a rotary brush mounted between enclosing, freewheeling discs the brush and each disc being rotatably mounted between side frames, the side frames being pivotally mounted at an axis horizontally displaced from the brush.

3. A harvester as claimed in claim 2 wherein the grill means comprises upper and lower collection grids or rakes which are supported between the side plates to define a collection passage therebetween into which the brush flicks or projects produce and other like articles, the collection grids or rakes projecting into the brush, the lower collection grid or rake comprising fingers extended beneath the brush to scoop produce and other like articles swept from the ground.

4. A harvester as claimed in claim 3 wherein the produce conveyor comprises a plurality of spaced belts extended around four pulleys to create a collection volume within the belts, the collection passage communicating with the collection volume.

5. A harvester as claimed in claim 4 wherein the collection volume is walled off by a grill or vent on the side opposite to the collection passage.

6. A harvester as claimed in claim 2 wherein the rotary brush of the at least one collection module is rotated by a chain drive coupled thereto from a drive shaft powered by a hydraulic motor.

7. A harvester as claimed in claim 6 wherein each module comprises a rotary brush driven by a chain drive off the same drive shaft.

8. A harvester as claimed in claim 1 wherein the plurality of collection modules lie side by side in a linear array within an elongate housing provided with support wheels and coupling means for attachment to a prime mover and an elevator is provided at the discharge point to deliver produce and other like articles therefrom to a collection bin or storage means.

9. A harvester as claimed in claim 8 wherein there is provided a means to move produce lying on a line between adjoining modules from that position into the path of a module.

10. A harvester apparatus for harvesting produce and other like articles off the ground comprising:

an elongate housing mounted on support wheels;

a plurality of collection modules linearly arrayed side by side along the elongate length of the housing, each module extended transversely of the housing;

a conveyor means extended the length of the housing to receive produce and other like articles from the collection modules and move it to one end of the housing; and an elevator at the one end to receive produce and the like articles delivered thereto to left the produce and other like articles to discharge it into a collection bin or trailer;

the collection modules being independently mounted pivotally within the housing to rise and fall with local contours independently of the housing.

11. A harvester as claimed in claim 10 wherein the collection modules are each pivotally mounted on the same axis with a common drive shaft passed therealong, each collection module being powered by a take off from the drive shaft with a rotary brush means being turned to collect produce or other like articles.

* * * * *